(12) United States Patent
Beach et al.

(10) Patent No.: US 11,167,785 B1
(45) Date of Patent: Nov. 9, 2021

(54) STEERING COLUMN REARWARD RETENTION FEATURE

(71) Applicant: Steering Solutions IP Holding Corporation, Saginaw, MI (US)

(72) Inventors: Timothy D. Beach, Saginaw, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 13 days.

(21) Appl. No.: 16/867,981

(22) Filed: May 6, 2020

(51) Int. Cl.
| | |
|---|---|
| *B62D 1/181* | (2006.01) |
| *F16H 25/20* | (2006.01) |
| *B62D 1/185* | (2006.01) |
| *B62D 1/187* | (2006.01) |

(52) U.S. Cl.
CPC ............ *B62D 1/181* (2013.01); *B62D 1/185* (2013.01); *B62D 1/187* (2013.01); *F16H 25/20* (2013.01)

(58) Field of Classification Search
CPC ........ B62D 1/181; B62D 1/185; B62D 1/187; F16H 25/20
See application file for complete search history.

(56) References Cited

U.S. PATENT DOCUMENTS

| | | | | |
|---|---|---|---|---|
| 2019/0152506 | A1* | 5/2019 | Shiroishi | B62D 1/184 |
| 2019/0322307 | A1* | 10/2019 | Kwon | B62D 1/195 |
| 2020/0039566 | A1* | 2/2020 | Sekiguchi | B62D 1/181 |
| 2020/0207402 | A1* | 7/2020 | Fricke | B62D 1/195 |
| 2021/0129891 | A1* | 5/2021 | Ryne | B62D 1/181 |

FOREIGN PATENT DOCUMENTS

| | | | | |
|---|---|---|---|---|
| DE | 102019219112 A1 * | 6/2020 | | B62D 1/184 |
| DE | 102019201390 A1 * | 8/2020 | | B62D 1/181 |
| KR | 20200092623 A * | 8/2020 | | |
| KR | 20210014332 A * | 2/2021 | | |
| WO | WO-2018178168 A1 * | 10/2018 | | F16F 7/125 |

* cited by examiner

*Primary Examiner* — Drew J Brown
(74) *Attorney, Agent, or Firm* — Dickinson Wright PLLC

(57) ABSTRACT

A steering column assembly includes a lower jacket having a bridge proximate a forward end of the lower jacket, the bridge defining a slot. The assembly also includes an upper jacket in telescoping engagement with the lower jacket. The steering column assembly further includes a telescope actuator assembly. The steering column assembly yet further includes a telescope drive bracket operatively coupled to, and translated by, the telescope actuator assembly, the telescope drive bracket having a base portion coupled to the upper jacket to move the upper jacket in a telescope direction relative to the lower jacket. The steering column assembly also includes a plate coupled to an outer surface of the upper jacket and disposed between the base portion of the telescope drive bracket and the upper jacket, the plate having a retention feature positioned to contact the bridge of the lower jacket to define a rearward telescope limit.

15 Claims, 6 Drawing Sheets

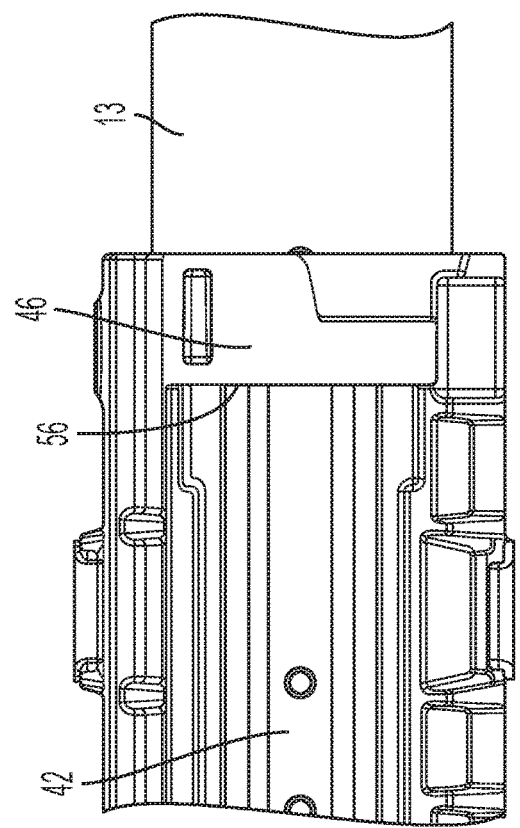
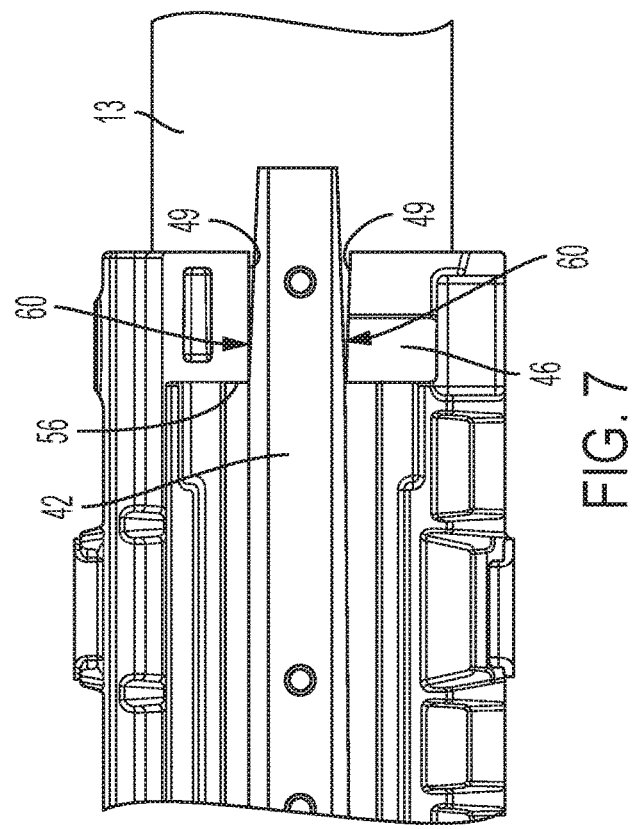

STEERING COLUMN REARWARD RETENTION FEATURE

FIELD OF THE INVENTION

The embodiments described herein relate to vehicle steering systems and, more particularly, to a rearward retention feature.

BACKGROUND

A steering column assembly of a vehicle may be adjustable in a rake (tilt) direction and/or in a telescoping direction. Each of these adjustments may be carried out with respective power assemblies or mechanisms. Typical telescope drive systems may include a telescope drive bracket mounted to a column jacket. The telescope drive system is mounted rigidly at one location, while another location moves in a linear direction, thus driving the component it is fixed to, resulting in a desired telescope travel.

Certain design requirements for steering column assemblies may require retention of steering shaft, as well as associated components, when moving in a rearward direction. However, it would be undesirable to have the steering shaft, as well as any associated component(s), separate while applying a rearward load on the steering shaft during the aforementioned rearward retention.

SUMMARY

According to one aspect of the disclosure, a steering column assembly includes a lower jacket having a bridge proximate a forward end of the lower jacket, the bridge defining a slot. The steering column assembly also includes an upper jacket in telescoping engagement with the lower jacket. The steering column assembly further includes a telescope actuator assembly. The steering column assembly yet further includes a telescope drive bracket operatively coupled to, and translated by, the telescope actuator assembly, the telescope drive bracket having a base portion coupled to the upper jacket to move the upper jacket in a telescope direction relative to the lower jacket. The steering column assembly also includes a plate coupled to an outer surface of the upper jacket and disposed between the base portion of the telescope drive bracket and the upper jacket, the plate having a retention feature positioned to contact the bridge of the lower jacket to define a rearward telescope limit.

According to another aspect of the disclosure, a steering column assembly includes a lower jacket. The steering column assembly also includes an upper jacket in telescoping engagement with the lower jacket. The steering column assembly further includes a telescope actuator assembly. The steering column assembly yet further includes a telescope drive bracket operatively coupled to, and translated by, the telescope actuator assembly, the telescope drive bracket having a base portion coupled to the upper jacket to move the upper jacket in a telescope direction relative to the lower jacket. The steering column assembly also includes a retention feature operatively coupled to the base portion of the telescope drive bracket positioned to contact the lower jacket to define a rearward telescope limit.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 is a plan view of a retention feature according to another aspect of the disclosure; and FIG. 8 is a plan view of a retention feature according to another aspect of the disclosure.

DETAILED DESCRIPTION

Referring now to the Figures, where the invention will be described with reference to specific embodiments, without limiting same, illustrated are embodiments of a retention feature that prevents rearward translation of a steering shaft—and associated components—beyond a predetermined position, while avoiding separation of the steering column during such retention.

Figure 1:
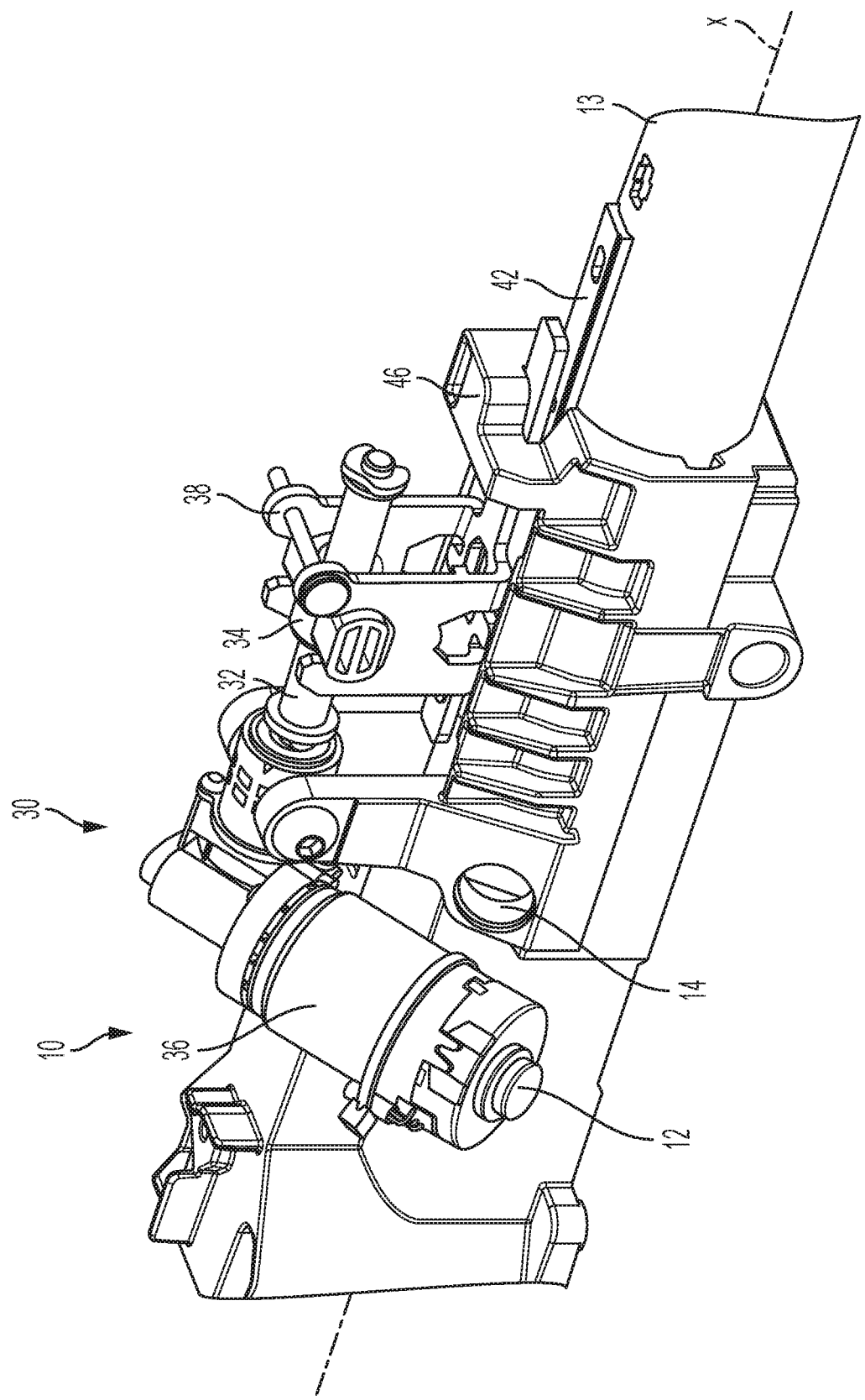
FIG. 1 is a front perspective view of a steering column assembly.
Figure 2:
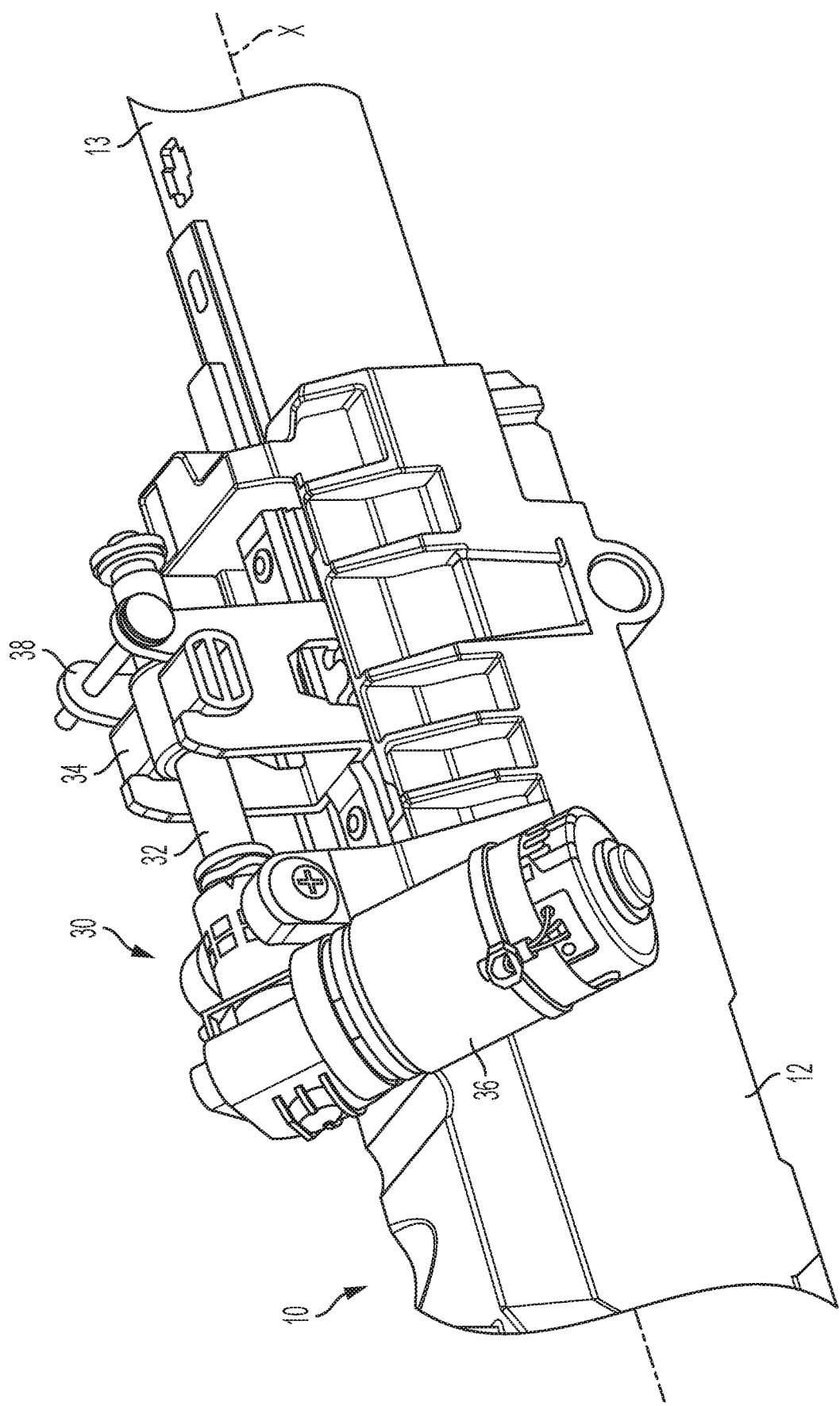
FIG. 2 is a rear perspective view of the steering column assembly.

FIGS. 1 and 2 illustrate a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and may be adjustable in a rake/tilt direction in some embodiments. The steering column assembly 10 includes a lower jacket 12, an upper jacket 13, and a steering shaft 14 extending along the longitudinal axis X. The steering shaft 14 and the upper jacket 13 are operatively coupled to each other and disposed in telescoping engagement with the lower jacket 12. In other words, the steering shaft 14 has a portion disposed within the upper jacket 13 and a portion disposed within the lower jacket 12. The upper jacket 13 has a portion extending into the lower jacket 12 and is translatable therein.

A telescope actuator assembly 30 is provided to facilitate powered telescope adjustments of the upper jacket 13 and the steering shaft 14. The telescope actuator assembly 30 includes a leadscrew 32 having a nut 34 threaded thereto. A motor 36 drives the leadscrew 32 to translate the nut 34 therealong. The nut 34 is operatively coupled to the upper jacket 13 with a drive bracket 38, such that linear movement of the nut 34 along the leadscrew 32 drives the upper jacket 13 to and from different telescope positions.

Figure 3:
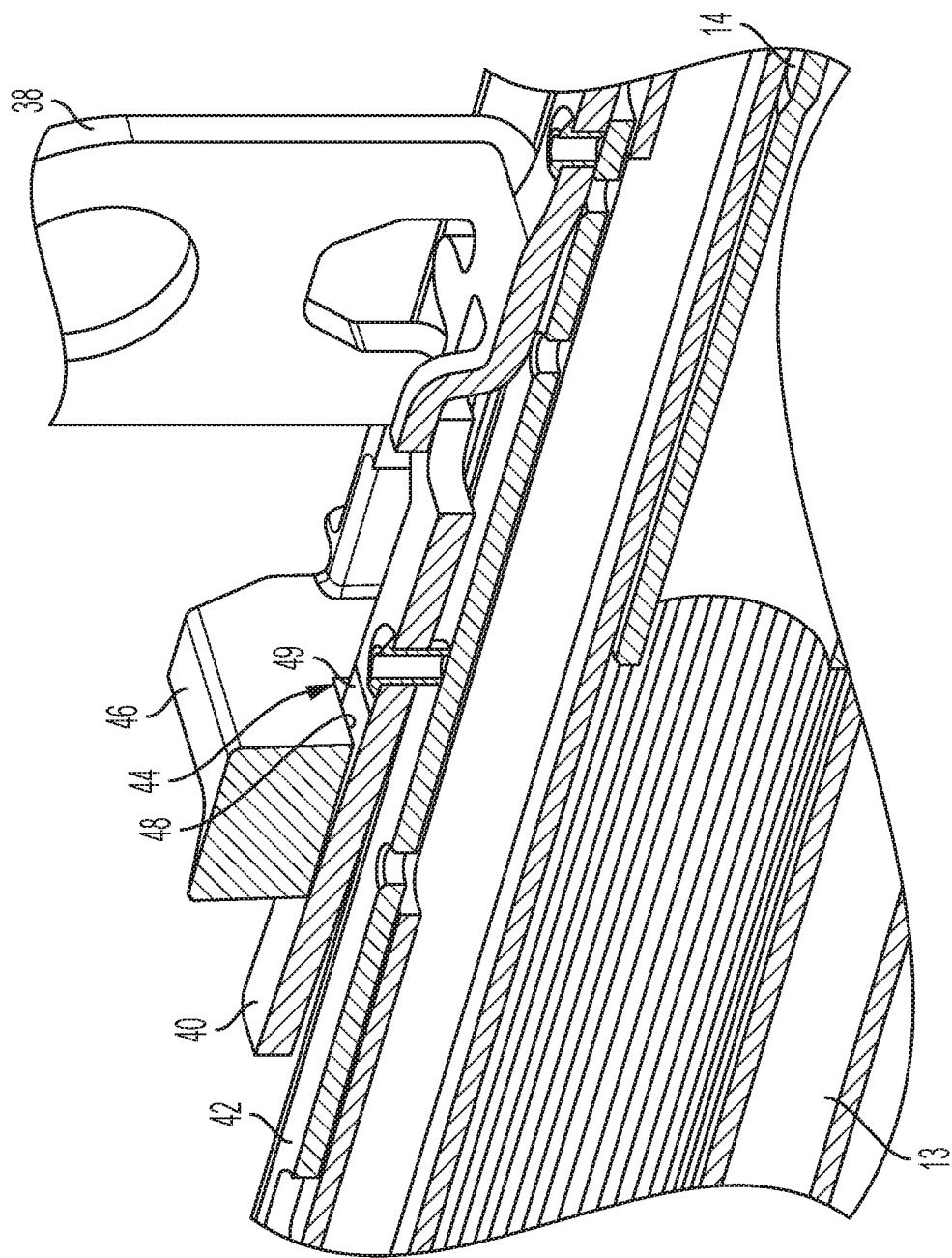
FIG. 3 is a partial cross-sectional view of a portion of a telescope drive bracket and an upper and lower jacket interface.

Referring now to FIG. 3, the drive bracket 38 connection to the upper jacket 13 is shown in greater detail. In particular, the drive bracket 38 includes a base portion 40 that extends longitudinally in a direction substantially parallel to the longitudinal axis X. While it is contemplated that the base portion 40 of the drive bracket 38 may be directly secured to an outer surface of the upper jacket 13, a plate 42 is provided in some embodiments, as illustrated. The plate 42 may be welded to the upper jacket 13 in some embodiments, but other securing processes are contemplated. The plate 42 provides additional material thickness to better facilitate mechanical fastening of the drive bracket 38—and/or possible other components—to the upper jacket 13. The base portion 40 of the drive bracket 38 may be fastened to the plate 42 and upper jacket 13 with bolts, rivets or the like.

As shown in FIGS. 1-3, the plate 42 and the base portion 40 extend through a slot 44 defined by a bridge 46 of the lower jacket 12. Specifically, the slot 44 is defined by an outer wall 48 and a pair of sidewalls 49. As the upper jacket 13 and the steering shaft 14 translate during powered telescopic adjustment, the plate 42 and the base portion 40 slide through the slot 44.

Figure 4:
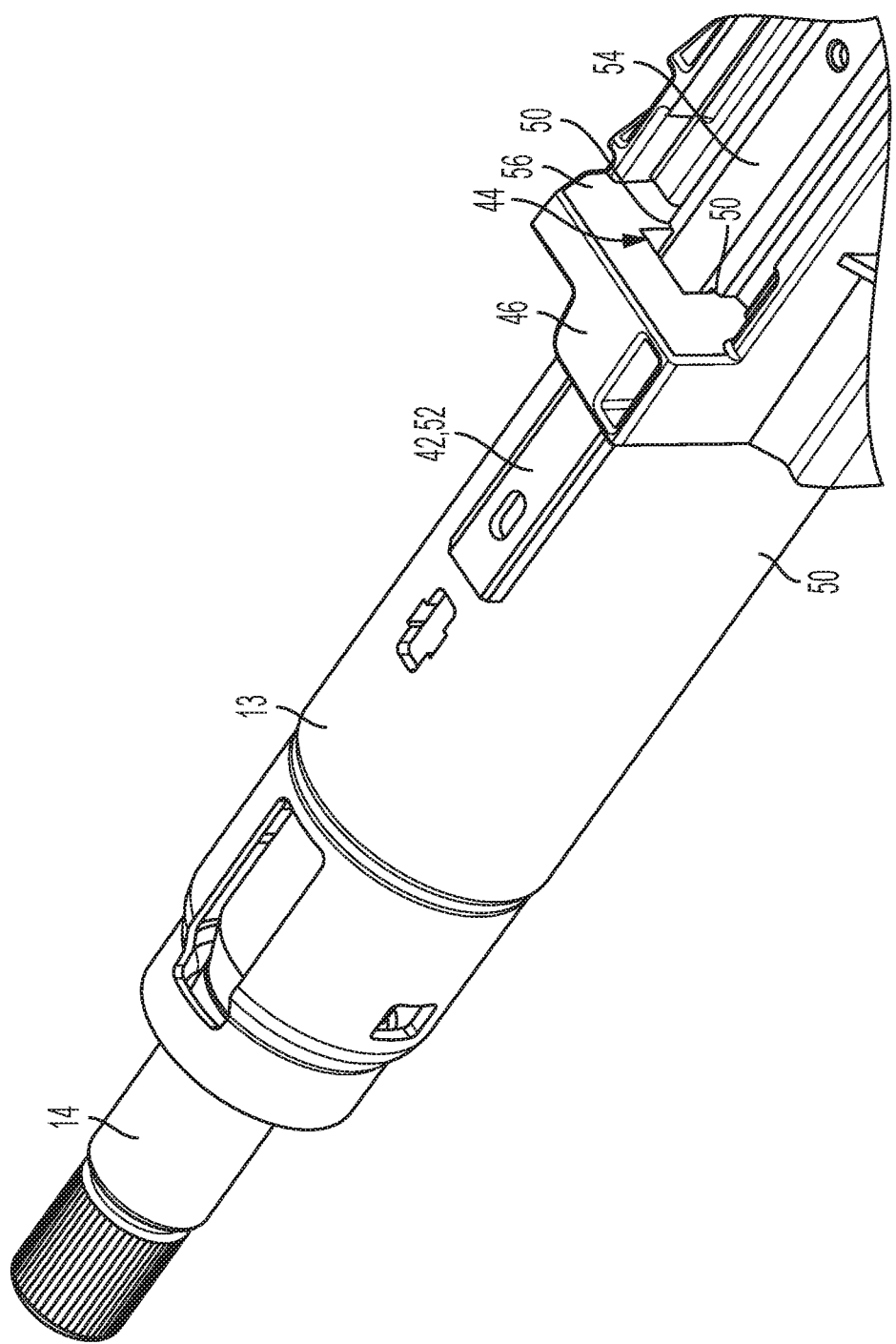
FIG. 4 is a perspective view of a retention feature.
Figure 6:
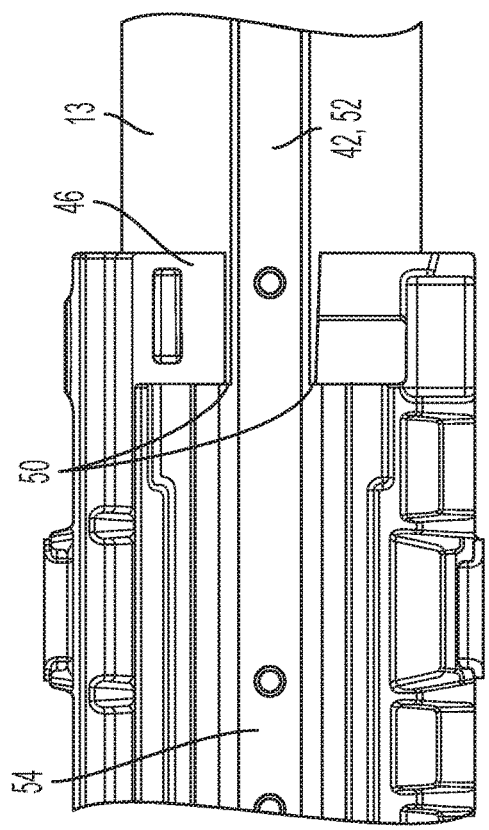
FIG. 6 is a plan view of the retention feature of FIGS. 4 and 5.
Figure 5:
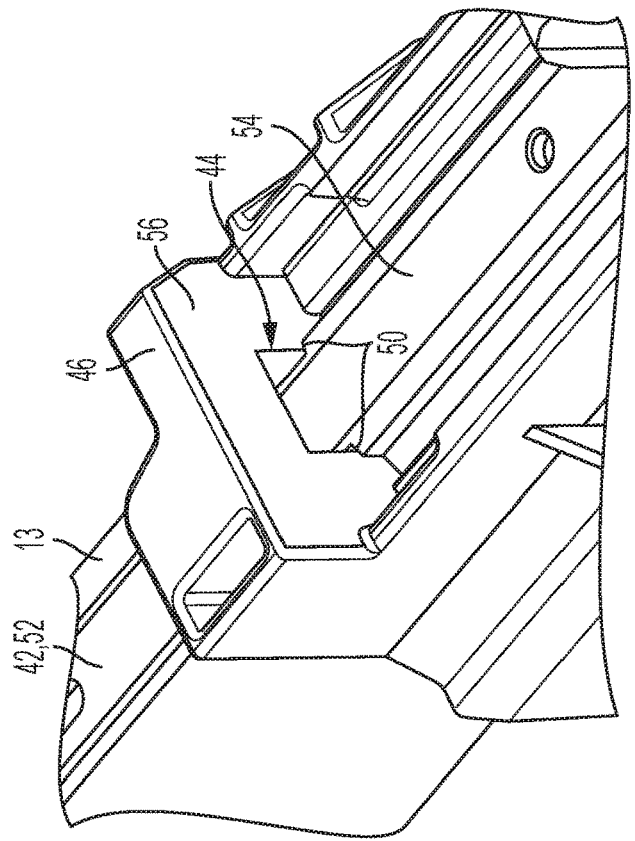
FIG. 5 is an enlarged perspective view of the retention feature of FIG. 4.

Referring now to FIGS. 4-6, a retention feature that resists rearward translation of the upper jacket 13 and steering shaft 14 beyond a predetermined position is illustrated according to one aspect of the disclosure. The retention feature includes a pair of steps 50 formed on the plate 42. The pair of steps 50 extend laterally to an extent necessary to not be able to pass through the slot 44 defined by the bridge 46. In other words, the plate 42 includes a first portion 52 having a first width and a second portion 54 having a second width that is greater than the first width. The pair of steps 50 contact a forward face 56 of the bridge 46 to define the rearward movement limit.

In the illustrated embodiment, a pair of steps are provided, but it is contemplated that only one side of the plate 42 has a step 50. Additionally, it is contemplated that the base portion 40 of the drive bracket 38 includes the steps 50, rather than the plate 42, or in addition to the plate 42.

Referring now to FIG. 7, another aspect of the retention feature is shown. The retention feature in the illustrated embodiment is a tapered region 60 of the plate 42. In particular, the plate 42 tapers inwardly from a greater width to a narrower width in a direction from forward to rearward of the plate 42 and upper jacket 13. The tapering is dimensioned to ensure a frictional slowing and eventual stopping of the rearward movement of the plate 42 during translation. This is accomplished by frictional engagement between the plate 42 and the sidewalls 49 and/or forward face 56 of the bridge 46. It is contemplated that the base portion 40 of the drive bracket 38 includes the tapered profile, rather than the plate 42, or in addition to the plate 42.

Referring now to FIG. 8, another aspect of the retention feature is shown. The retention feature in the illustrated embodiment is simply an enlarged end of the plate 42 that does not permit any portion of the plate 42 to extend to a rearward side of the bridge 46. In other words, unlike the embodiments of FIGS. 1-7, the plate 42 does not pass through a slot of the bridge 46 and the end of the plate 42 simply contacts the forward face 56 of the bridge 46 at the rearward travel limit.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket having a bridge proximate a forward end of the lower jacket, the bridge defining a slot;
   an upper jacket in telescoping engagement with the lower jacket;
   a telescope actuator assembly;
   a telescope drive bracket operatively coupled to, and translated by, the telescope actuator assembly, the telescope drive bracket having a base portion coupled to the upper jacket to move the upper jacket in a telescope direction relative to the lower jacket; and
   a plate coupled to an outer surface of the upper jacket and disposed between the base portion of the telescope drive bracket and the upper jacket, the plate having a retention feature positioned to contact the bridge of the lower jacket to define a rearward telescope limit.

2. The steering column assembly of claim 1, wherein the plate extends through the slot defined by the bridge, the retention feature of the plate comprising a pair of laterally extending steps positioned to contact a forward face of the bridge to define the rearward telescope limit.

3. The steering column assembly of claim 1, wherein the plate extends through the slot defined by the bridge, the retention feature of the plate comprising a tapered width portion of the plate.

4. The steering column assembly of claim 1, wherein an end of the plate defines the retention feature, the end having a cross-sectional area that is greater than the area of the slot of the bridge.

5. The steering column assembly of claim 1, wherein the telescope actuator assembly comprises:
   a leadscrew driven by the motor; and
   a nut in threaded engagement with the leadscrew, the nut moveable along the leadscrew to drive the telescope drive bracket in the telescope direction.

6. The steering column assembly of claim 1, wherein the plate is welded to the upper jacket.

7. The steering column assembly of claim 1, wherein the base portion of the telescope drive bracket is coupled to the plate and the upper jacket with at least one mechanical fastener.

8. A steering column assembly comprising:
   a lower jacket;
   an upper jacket in telescoping engagement with the lower jacket;
   a telescope actuator assembly;
   a telescope drive bracket operatively coupled to, and translated by, the telescope actuator assembly, the telescope drive bracket having a base portion coupled to the upper jacket to move the upper jacket in a telescope direction relative to the lower jacket; and
   a retention feature operatively coupled to the base portion of the telescope drive bracket positioned to contact the lower jacket to define a rearward telescope limit.

9. The steering column assembly of claim 1, wherein the lower jacket includes a bridge proximate a forward end of the lower jacket, the bridge defining a slot, the retention feature contacting a forward face of the bridge to define the rearward travel limit.

10. The steering column assembly of claim 9, further comprising a plate coupled to the upper jacket and disposed between the base portion and the upper jacket, wherein the retention feature is part of the plate, the plate extending through the slot defined by the bridge, the retention feature of the plate comprising a pair of laterally extending steps positioned to contact a forward face of the bridge to define the rearward telescope limit.

11. The steering column assembly of claim 10, wherein the plate is welded to the upper jacket.

12. The steering column assembly of claim 11, wherein the base portion of the telescope drive bracket is coupled to the plate and the upper jacket with at least one mechanical fastener.

13. The steering column assembly of claim 9, further comprising a plate coupled to the upper jacket and disposed between the base portion and the upper jacket, wherein the retention feature is part of the plate, wherein the plate extends through the slot defined by the bridge, the retention feature of the plate comprising a tapered width portion of the plate.

14. The steering column assembly of claim 9, further comprising a plate coupled to the upper jacket and disposed between the base portion and the upper jacket, wherein the retention feature is part of the plate, wherein an end of the plate defines the retention feature, the end having a cross-sectional area that is greater than the area of the slot of the bridge.

15. The steering column assembly of claim 8, wherein the telescope actuator assembly comprises:
    a leadscrew driven by the motor; and
    a nut in threaded engagement with the leadscrew, the nut moveable along the leadscrew to drive the telescope drive bracket in the telescope direction.

* * * * *